United States Patent [19]
Fleischman et al.

[11] Patent Number: 5,388,259
[45] Date of Patent: Feb. 7, 1995

[54] SYSTEM FOR ACCESSING A DATABASE WITH AN ITERATED FUZZY QUERY NOTIFIED BY RETRIEVAL RESPONSE

[75] Inventors: Robert M. Fleischman, Brookline, Mass.; William H. Mansfield, Pittstown, N.J.

[73] Assignee: Bell Communications Research, Inc., Livingston, N.J.

[21] Appl. No.: 883,098

[22] Filed: May 15, 1992

[51] Int. Cl.⁶ .......................................... G06F 15/40
[52] U.S. Cl. ................................. 395/600; 395/61; 364/DIG. 1; 364/282.1; 364/274
[58] Field of Search ................................. 395/600, 61; 364/419.08; 370/92

[56] References Cited

U.S. PATENT DOCUMENTS

| | | | |
|---|---|---|---|
| 4,429,385 | 1/1984 | Cichelli et al. | 370/92 |
| 4,839,823 | 6/1989 | Matsumoto | 395/61 |
| 4,870,568 | 9/1989 | Kahle et al. | 395/600 |
| 5,006,978 | 4/1991 | Neches | 395/650 |
| 5,050,075 | 9/1991 | Herman et al. | 395/600 |
| 5,175,801 | 12/1992 | Iokibe | 395/61 |
| 5,230,073 | 7/1993 | Gausmann et al. | 395/600 |
| 5,251,131 | 10/1993 | Masand et al. | 364/419.08 |
| 5,321,833 | 6/1994 | Chang et al. | 395/600 |

OTHER PUBLICATIONS

L. Zadeh, "Fuzzy Sets," *Information and Control*, 1965, vol. 8, pp. 338–353.

V. Tahani, "A Conceptual Framework For Fuzzy Query Processing-A Step Towards Very Intelligent Database Systems," *Information Processing and Management*, 1977, vol. 13, pp. 289–303.

B. Buckles et al., "A Fuzzy Representation of Data For Relational Databases," *Fuzzy Sets & Systems*, 1982, vol. 7, pp. 213–226.

J. Kacprzyk et al., "FQUERY 111+: A Human Consistent Database Querying System Based on Fuzzy Logic with Linguistic Qualifiers," *Information Systems*, 1989, vol. 14, pp. 443–453.

S. Isaka et al., "On the Design and Performance Evaluation of Adaptive Fuzzy Controllers," *Proceedings of the 27th Conference on Decision and Control*, 1988, Austin, Tex., pp. 1068–1069.

H. Chunyu et al., "A Technique For Designing and Implementing Fuzzy Logic Control," *Proceedings of the 1989 American Control Conference*, 1989, vol. 3, pp. 2754–2755.

*Primary Examiner*—Thomas G. Black
*Assistant Examiner*—Wayne Amsbury
*Attorney, Agent, or Firm*—Leonard Charles Suchyta; James W. Falk

[57] ABSTRACT

A method and system are disclosed for evaluating imprecise database queries. At the time the imprecise query is executed, a membership function, representing the imprecise criteria of the query, is applied to entries of the databases. Data items are then accordingly identified depending on the results obtained from applying the membership function to entries of the database.

2 Claims, 6 Drawing Sheets

FIG. 1

|  | 2-1 | 2-2 | 2-3 | 2-4 | 2-5 | 2-6 |
|---|---|---|---|---|---|---|
|  | NAME | AGE | WEIGHT | HEIGHT | SOC. SEC. # | TELEPHONE EXT. |
| 3-1 | SMITH | 21 | 150 | 170 | 999-12-3456 | 1234 |
| 3-2 | JONES | 5 | 70 | 107 | 999-23-4567 | 2345 |
| 3-3 | JOHNSON | 26 | 175 | 172 | 999-34-5678 | 3456 |
| 3-4 | KRANE | 35 | 160 | 165 | 999-45-6789 | 4567 |
| 3-5 | CARTWRIGHT | 71 | 145 | 167 | 999-56-7891 | 5678 |
| 3-6 | KOOP | 65 | 160 | 175 | 999-67-8912 | 6789 |
| 3-7 | AMES | 58 | 172 | 183 | 999-78-9123 | 7890 |
| 3-8 | BROWN | 32 | 189 | 178 | 999-89-1234 | 8901 |
| 3-9 | SEBASTIAN | 31 | 206 | 185 | 999-91-2345 | 9012 |
| 3-10 | LEE | 40 | 171 | 180 | 999-98-7654 | 0123 |
| 3-11 | MOORE | 46 | 121 | 165 | 999-87-6543 | 0987 |
| 3-12 | PERSOD | 15 | 158 | 167 | 999-76-5432 | 1098 |

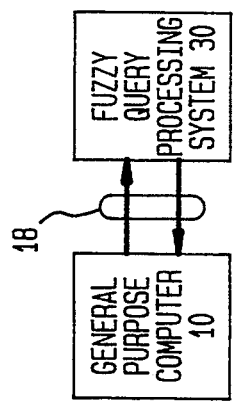
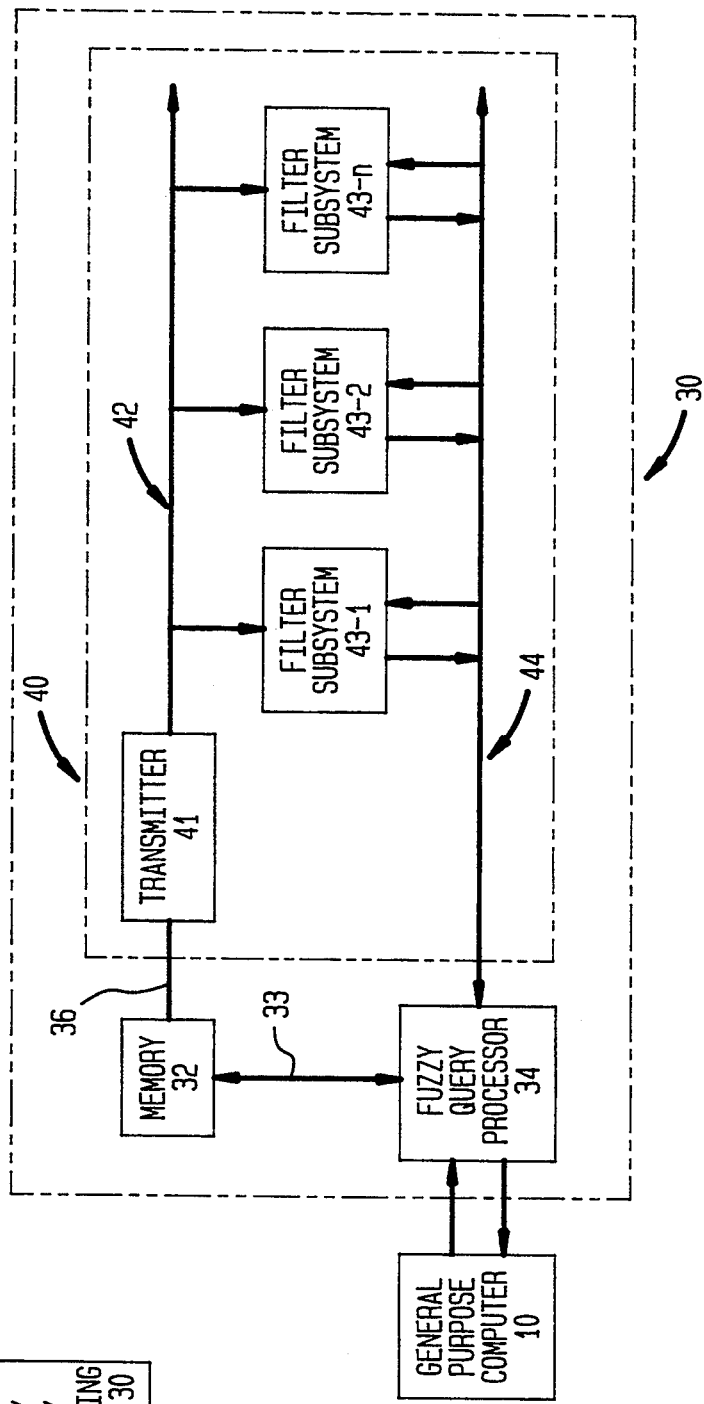

SYSTEM FOR ACCESSING A DATABASE WITH AN ITERATED FUZZY QUERY NOTIFIED BY RETRIEVAL RESPONSE

RELATED APPLICATIONS

The following U.S. patent and patent applications are assigned to the assignee hereof and contain subject matter related to the subject matter of the present application:

1. U.S. Pat. No. 5,050,075, entitled "High performance VLSI Data Filter", and issued Sep. 17, 1991;

2. U.S. patent application Ser. No. 07/630,556, entitled "Optimistic Concurrency Control Certification Using Hardware Filtering", filed for William H. Mansfield, Jr. and Thomas F. Bowen on Dec. 20, 1991, now U.S. Pat. No. 5,263,156, issued Aug. 17, 1993; and 3. U.S. patent application Ser. No. 07/630,557, entitled "System and Method for Updating Database Values Without Locks", filed for William H. Mansfield, Jr. and Thomas F. Bowen on Dec. 20, 1991, now pending.

The contents of the above-identified related patent and patent applications are incorporated herein by reference.

FIELD OF THE INVENTION

The present invention relates to a system and method for performing imprecise database queries on a database. The inventive system and method are especially applicable to performing imprecise queries on databases which contain precise numerical data values. More particularly, the present invention relates to identifying data items from a database which satisfy imprecise criteria such as "near," "high," "old" and "young."

The invention utilizes an innovative system and method for evaluating imprecise queries in real time, i.e., at the time the queries are executed. At the time the imprecise query is executed, a function known as a membership function, representing the imprecise criteria of the query, is applied to the entries of the database. The results obtained from applying the membership function to entries of the database indicate the possibility that each entry satisfies the imprecise criteria of the query. Data items are then accordingly identified in the order in which they satisfy the imprecise criteria of the query.

BACKGROUND OF THE INVENTION

A database is defined as a collection of data items, organized according to a data model, and accessed via queries. The present invention applies to any data model. The invention is illustrated using a relational database model.

In a relational database or relation, data values are organized into columns or fields wherein each column comprises one attribute of the relation. Each column or attribute of the relation has a domain which comprises the data values of that attribute. Each row of a relation, which includes one value from each attribute, is known as a record or tuple.

FIG. 1 shows an exemplary relational database. The relation 1 of FIG. 1 contains data pertaining to a population group. The relation 1 has six attributes or columns 2-1, 2-2, 2-3, ..., 2-6 for storing, respectively, name, age, weight, height, social security number and telephone extension data values of the population. The database also has twelve records or tuples 3-1, 3-2, 3-3, ..., 3-12. Each tuple 3-1, 3-2, 3-3, ..., 3-12 has one data value from each attribute. For instance, the tuple 3-10 has the name attribute value "Lee" the age attribute value 40, the weight attribute value 171, the height attribute value 180, the social security number attribute value 999-98-7654 and the telephone extension attribute value 0123.

Often, it is desirable to identify and/or retrieve tuples of interest or tuples which meet criteria of interest. Queries are used to retrieve tuples of interest from a relation using selection operations. Queries may be predefined, i.e., accessed from libraries, or dynamic, i.e., defined and translated into selection operations at run time. Predefined queries restrict flexibility as only predefined queries stored in the library may be evaluated. Dynamic queries, on the other hand, may be freely defined and executed at run time. Dynamic queries are also referred to as ad hoc queries.

Selection operations incorporate precise and/or imprecise predicates. Predicates are logical or mathematical expressions for specifying the criteria which must be satisfied by the tuples in order to be selected. For instance, it may be desired to select all tuples of a relation R having an attribute A value which is the same as some constant c. Such a selection operation is denoted $R \cdot A = C$ or $S_{R \cdot A = C}$. The selection operation is specified by the precise predicate "A=C". The precise predicate, in turn, incorporates the precise selection operator "equals" for specifying the desired criteria that the selected tuples must satisfy. Other precise selection operators include "greater than," "less than," etc. Additionally, individual precise predicates may be combined with logical operators "AND," "OR," "NOT," etc.

Precise predicates are predicates which return one of two values, i.e., "1" or "0". For example, "A=C" is a precise predicate which is logic "1" for all values of the attribute A which equal the constant c and which is logic "0" otherwise. In the evaluation of a query comprising only a precise predicate (called a precise query), the precise predicate of the query is applied to the corresponding attribute value of each tuple in the relation. This query identifies the set containing only the tuples for which the application of the precise predicate returns a logic "1" value. Such a set is referred to as the read set. The tuples contained in the read set are said to satisfy the precise predicate of the query.

An imprecise predicate, on the other hand, cannot always identify with certainty the tuples which satisfy and which do not satisfy the imprecise criteria comprised therein. Rather, an imprecise predicate depends on criteria which by their nature are ambiguous or difficult to quantify exactly. For example, consider the relation pertaining to a population group illustrated in FIG. 1. An imprecise predicate which requires identification of tuples having young age attribute values (denoted young(age)) cannot discriminate between all tuples with complete certainty. This is because there is no consensus opinion as to which age values are young and which are not. Furthermore, the imprecise predicate young(age) may depend on the domain of the age attribute. For instance, the age value 65 may not be young in the domain of ages (1,70), but may be young in the domain of ages (60,90).

Queries comprising an imprecise predicate (called imprecise queries) may be implemented using fuzzy set theory. In fuzzy set theory, a membership function is defined which determines the degree to which a particular object belongs to a group or set based on numerical criteria. Such sets, called fuzzy sets, comprise certain objects with absolute certainty and other objects with varying degrees of membership. See L. Zadeh, "Fuzzy Sets," *Information and Control*, vol. 8 (1965). Zadeh proposes that imprecise predicates, also called fuzzy predicates, may be evaluated by defining a membership function for each imprecise predicate.

In evaluating an imprecise query, the membership functions corresponding to the imprecise predicates of the query are applied to appropriate attribute values of each tuple in the relation. The application of each membership function returns a possibility value in the continuous range of (0,1) (rather than only one of two values, "0" or "1"). These possibility values indicate the possibility that the tuple satisfies the criteria of the imprecise predicate. A fuzzy set is thereby formed comprising tuples with varying degrees of membership depending on the possibility values returned by the membership function. Tuples may be selected or identified if their respective possibility values exceed some threshold. Thus, the read set of an imprecise predicate may be defined as the fuzzy set of tuples (or subset thereof) derived using the appropriate membership function. The read set would comprise the tuples which may possibly satisfy the imprecise predicate and their associated possibility values.

An example of such a membership function is depicted in FIG. 2. In FIG. 2, a membership function f(x) corresponding to the imprecise predicate young(age) is depicted. As shown in FIG. 2, the domain of the age attribute of the relation is plotted along the abscissa and the possibility values are plotted along the ordinate. As defined by the membership function f(x), tuples having age values 0 to 15 definitely satisfy young(age) as the application of f(x) to these age values returns the possibility value of 1. Further, tuples having values 20 or greater definitely do not satisfy the imprecise predicate young(age) as the corresponding membership function f(x) returns a possibility value of 0 for these age values. Finally, it is not certain whether or not tuples having age values between 15 and 20 satisfy young(age) or not. However, the membership function f(x) defines a possibility between 0 and 1 that these tuples satisfy the imprecise predicate young(age). As depicted, tuples having age values closer to 15 have a greater possibility than tuples having age values closer to 20 of satisfying young(age).

Membership functions such as f(x) depicted in FIG. 2 map each attribute value to a particular possibility value. Furthermore, if such membership functions are applied to a particular attribute value, the membership function will always return the same possibility value. The returned possibility value is the same even if the domain of attributes, over which the membership function is defined, is narrowed. For example, if f(x) of FIG. 2 is defined over the domain of age values (1,90), f(65) always equals 0 whether the domain is narrowed to (1,70) or (60,90). Membership functions which map attribute values to particular possibility values in this manner are called "static membership functions."

In fuzzy set theory, membership functions may also be defined which depend on more than one attribute. Such membership functions are referred to as multi-dimensional membership functions. Multi-dimensional membership functions may be defined for evaluating imprecise predicates which depend on more than one attribute. For example, an imprecise predicate could be defined to identify tuples in the relation pertaining to a population group illustrated in FIG. 1 which are "healthy" depending on the height and weight attribute values of the tuples.

Fuzzy set theory also defines fuzzy logic operators for logically combining individual membership functions. Suppose $g(A_1)$ denotes a first membership function (corresponding to a first imprecise predicate) which is applied to a first attribute $A_1$. Similarly, suppose $h(A_2)$ denotes a second membership function (corresponding to a second imprecise predicate) which is applied to a second attribute $A_2$. Each membership function returns a possibility value in the range (0,1). A union operation or logical or is defined as the maximum of the results of these two membership functions. Such an operation is denoted $\max(g(A_1),h(A_2))$. Similarly, an intersection operation or logical AND is defined as the minimum of the results of these two membership functions. The logical AND operation is denoted $\min(g(A_1),h(A_2))$. Finally, the complementation operation or logical NOT is defined as one minus the results of either membership function. The logical NOT operation is denoted $1-g(A_1)$ (or $1-h(A_2)$).

The above discussion has been presented to introduce basic principles necessary for understanding prior art methods for evaluating imprecise database queries. Some prior art proposals have disclosed implementations for evaluating imprecise queries using fuzzy set theory. See V. Tahani, *A Conceptual Framework for Fuzzy Query Processing—A Step Towards Very Intelligent Database Systems*, 1977; Buckles and Petry, "A Fuzzy Representation of Data for Relational Databases," 31 *Fuzzy Sets & Systems* (1982). The prior art has proposed imprecise query evaluation implementations using single dimensional, static membership functions. See J. Kacprzyk, S. Zadronsky, A. Ziolkowski, "FQUERY 111+: A Human Consistent Database Querying System Based on Fuzzy Logic with Linguistic Qualifiers," *Information Systems*, vol 14, no. 6, 443-53 (1989). These prior art implementations propose that membership functions for particular imprecise queries be defined prior to the creation of the relation. Data, e.g., tuples, are then stored in the relation. As tuples are stored in the relation, the predefined membership functions are applied to appropriate attributes of each tuple. Possibility values are thereby produced for each tuple as the tuple is stored in the relation. Additionally, a pointer is generated for each possibility value which points to the location in the relation of the one or more tuples corresponding to this possibility value. The pointer and the possibility values are then stored together in a separate storage structure.

The evaluation of an imprecise query requires the retrieval of each possibility value and its associated pointers from the separate storage structure corresponding to each imprecise predicate of the query. The pointers are then used to point to the location in the relation of the tuples corresponding to each possibility value. The tuples pointed to by the pointers may then be retrieved from the relation. If necessary, possibility values are combined using fuzzy logic operators. Finally, the tuples which may possibly satisfy the imprecise query, or a subset thereof, are placed into the read set.

In addition, the prior art does not disclose the support of multi-dimensional imprecise predicates. For example, the prior art does not disclose that a query comprising an imprecise predicate "healthy" which depends on two attributes, e.g., healthy(weight,height), could be evaluated.

The prior art paradigms present a number of limitations and disadvantages for the evaluation of imprecise queries including:

1. Since all membership functions are determined before queries are evaluated, the user cannot define new membership functions or alter existing membership functions dynamically. Thus, the set of imprecise queries which may be evaluated is limited to those for which membership functions were previously defined prior to storing the tuples in the relation. For example, suppose "young(age)" was the only imprecise predicate for which a membership function was defined before tuples were stored in a relation. A query could not be evaluated for retrieving all tuples having a "tall" height attribute value.

2. The mapping of attribute values to possibility values is fixed by the membership function. This prevents the evaluation of an imprecise query to return tuples relative to a narrowed domain. For example, suppose the membership function f(x) of FIG. 2 was defined for the imprecise predicate young(age) over the domain (1,90). A query to retrieve all young nursing home patients, i.e., over the domain of ages narrowed to (65,90), would not retrieve any tuples.

3. A space constraint is imposed in the paradigms disclosed by the prior art. Many possibility values and corresponding pointers must be stored for each membership function. In order to support a reasonable number of membership functions for certain applications, a large amount of storage capacity could be required.

Finally, no imprecise database query implementations have been disclosed which use adaptive feedback to modify membership functions. Adaptive feedback has been proposed for use with membership functions in control systems. Control systems use membership functions to control mechanical and electrical devices by varying control parameters based on the current state of the device. In such systems, a membership function translates information regarding the current state of a device into control parameter outputs. A critical aspect of such systems is the ability to adjust the membership function in real time to account for changes in the device or to deal with variations in the state information. See, S. Isaka, A. Sebald and A. Karimi, "On the Design and Performance Evaluation of Adaptive Fuzzy Controllers," *Proceedings of the 27th Conference on Decision and Control*, Austin, Tex., 1068–69 (1988); H. Chunyu, K. Toguchi, S. Shenol, L. Fran, "A Technique for Designing and Implementing Fuzzy Logic Control," *Proceedings of the* 1989 *American Control Conference*, Vol. 3, 2754–55 (1989). Accordingly, the prior art has proposed using the results of interactions between the control system and the controlled device as feedback to modify the membership functions. However, no implementations for imprecise database queries which use adaptive feedback have been disclosed.

It is therefore an object of the present invention to provide a system and method for evaluating imprecise predicates which permits the definition and application of membership functions at run time. It is also an object of the present invention to support membership functions which return possibility values relative to a domain selectively adjusted by the query processing system. Additionally, it is an object of the present invention to efficiently evaluate imprecise queries without additional storage structures for storing predetermined possibility values and pointers. Furthermore, it is an object of the present invention to support imprecise queries which require multi-dimensional membership functions. Finally, it is an object of the present invention to support imprecise database queries which use feedback to modify membership functions in real time.

SUMMARY OF THE INVENTION

The present invention achieves these and other objects using a real-time approach to evaluating membership functions. Instead of building a fixed mapping between tuples and possibility values as the tuples are added to the relation, membership functions are applied to attribute values of each tuple at the time queries are executed. This permits generic membership functions to be altered or defined as needed at run time. Additionally, separate storage structures for storing predetermined possibility values and pointers are not needed. Thus, queries requiring multi-dimensional membership functions may be executed with greater simplicity.

The real time execution of membership functions permits the dynamic, i.e., real time, definition of membership functions within the application. Thus, applications may request the evaluation of a variety of ad hoc queries that include imprecise predicates.

In accordance with an illustrative embodiment of the present invention, an imprecise database query to identify tuples may be efficiently evaluated in an electronic data processing system at the time it is executed by:

1. Using a processor, retrieving each tuple, or selected tuples, from a relation stored in memory;

2. Using the processor, applying each membership function of the imprecise query to appropriate attribute values of each tuple or selected tuples of a relation;

3. Using the processor, identifying the tuples of the relation which satisfy the imprecise query depending on the resulting possibility values.

Additionally, if necessary, the following step may be executed after step 3:

2a. For each tuple, using the processor to combine the possibility values returned by the above application of each membership function to compute a single resultant possibility value. In this step, possibility values are combined by the processor using fuzzy logic operators according to how the imprecise predicates were combined in the query.

In addition, the set of tuples which satisfy the imprecise query may be reduced by using the processor to remove tuples having a resultant possibility which is less than some threshold. Alternatively, the processor may identify only the N tuples with the highest resultant possibility values (where N is an integer).

The above steps may be modified to evaluate queries which include a precise predicate in addition to an imprecise predicate. Illustratively, prior to the first step, the processor applies the precise predicate to appropriate attributes of each tuple of the relation. Thereafter, the above steps may illustratively be applied to only those tuples which satisfy the precise predicate. Alternatively, both the imprecise and precise predicates are contemporaneously applied to each tuple of the relation by the processor.

In accordance with another illustrative embodiment, the present invention also increases the flexibility of specifying imprecise queries by employing statistical membership functions. Both the domain of statistical membership functions and the units thereof can be different from the domain which comprises the attribute values on which the statistical membership functions are applied. The data processing system modifies the statistical membership function by transforming its domain to a relevant subset of the attribute domain. There are many possible units for this transformation which may use percentages, standard deviations, logarithms, etc. The present invention, however, is illustrated using percentages. Thus, the statistical membership function is a function of percentages ( i.e., g(x%) ) rather than attribute values (i.e., g(A)). For example, a statistical membership for young(age) maps the first domain portion x%=0% to 10% to the possibility value 1 (definitely young), the domain portion x%=10% to 20% to a possibility profile beginning at 1 and ending at 0 and the domain portion x%=20% to 100% to the possibility value 0 (definitely not young). These statistical membership functions may be used in any domain of attribute values. This is highly desirable in imprecise query evaluation for a number of reasons:

1. Statistical membership functions may be included in queries which adjust the domain comprising the attribute values on which the membership functions are to be applied.

2. The same statistical membership function may be used for queries having different attribute domains. For example, the same statistical membership function for young(age) may be used in a query limited to nursery school children (e.g., ages 1–3) as well as a query limited to nursing home patients (e.g., ages 65–90).

3. The same statistical membership function may be used for queries executed on different attributes. Thus, young(age) could be used to identify young people, young equipment, young inventory, etc.

In yet another illustrative embodiment, the present invention provides an efficient system for evaluating imprecise queries at the time they are executed. The system includes a high speed transmitter capable of repetitively broadcasting the entire contents of a relation as a bitstream over a broadcast channel. Additionally, the system has one or more filter subsystems which monitor the bitstream on the broadcast channel.

Each filter subsystem is capable of applying one or more precise predicates, membership functions, logical operators or fuzzy logic operators on the fly to appropriate attributes broadcast on the broadcast channel. Additionally, each filter subsystem is connected in parallel to the broadcast channel. Thus, during a single broadcast, each filter subsystem may apply predicates in parallel with the other filter subsystems. The results of each filter subsystem may be transmitted to a fuzzy query processor which is illustratively connected to each filter in parallel. Illustratively, the fuzzy query processor combines the results of each filter on a per tuple basis.

In addition, the filter subsystems can identify tuples which have appropriate possibility values as the relation is broadcast. Alternatively, the filter subsystems return the possibility values to a processor. Thereafter, the processor performs a more complicated decision algorithm for identifying tuples.

In a further illustrative embodiment, a system or method according to the invention may use adaptive feedback to modify membership functions which correspond to imprecise predicates of a query. Adaptive feedback is particularly useful where the same query is repeatedly executed and it is desired to optimize each successive execution. Statistical membership functions, which automatically adapt to changed or updated relations, may illustratively be used. Alternatively, a membership function may be modified based on the tuples identified by a previous query.

The invention therefore provides an innovative approach and efficient hardware for evaluating imprecise queries. In this manner, flexibility is increased in formulating queries without sacrificing run-time efficiency.

BRIEF DESCRIPTION OF THE DRAWINGS

FIG. 1 depicts an exemplary database.

FIG. 5 depicts the interconnection of a general purpose computer to a fuzzy query processing system according to a preferred embodiment of the present invention.

FIG. 6 illustrates the fuzzy query processing system of FIG. 5 in greater detail.

DESCRIPTION OF THE INVENTION

Figure 3:
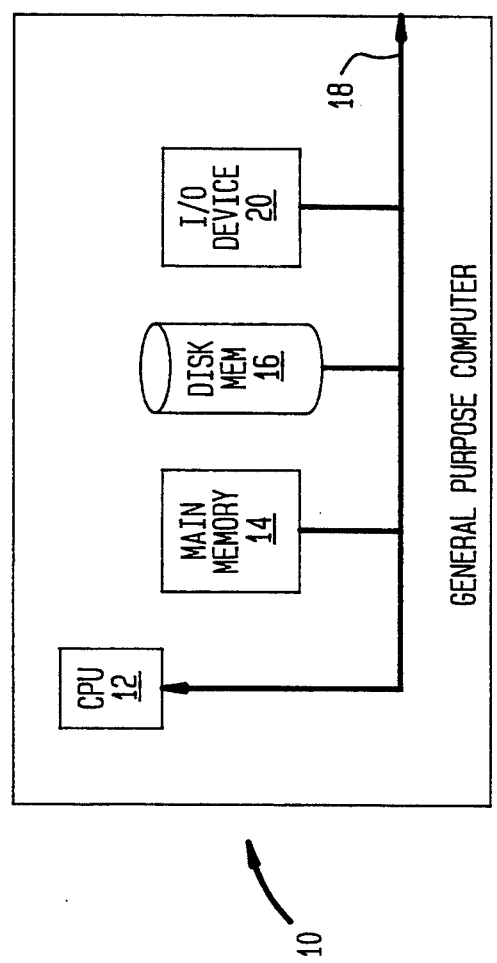
FIG. 3 depicts a general purpose computer.

The inventive system and method may be implemented using a general purpose computer. Referring now to FIG. 3, such a computer 10 is depicted. The general purpose computer has a CPU 12, connected via a bus 18 to a main memory 14, a disk memory 16 and an input/output (I/O) device 20. Illustratively, the I/O device 20 comprises a terminal capable of receiving inputted queries and displaying identified tuples.

A database such as a relational database comprising tuples or records (e.g., as depicted in FIG. 1) is initially stored in the main memory 14 and/or disk memory 16. Illustratively, when it is desired to execute a query, the query is first inputted to the general purpose computer 10. Preferably, the query is inputted to the CPU 12 via the I/O device 20 and the bus 18. The CPU 12 then retrieves each tuple from the memory 14 or 16 via the bus 18. If any precise predicates are comprised in the query, the CPU 12 thereafter illustratively applies the precise predicates separately to the attribute values of each tuple. Alternatively, the CPU 12 may apply both precise and imprecise predicates to the attribute values of each tuple contemporaneously. For example, suppose the relation comprising the data of a population group as depicted in FIG. 1 is stored in memory 14 or 16. Further, suppose it is desired to execute a query to identify all tuples in the relation having a "young" age attribute value and having a weight attribute value greater than 100 pounds. Illustratively, the portion of the query "weight>100 pounds" may be separately applied to the values of the weight attributes of each tuple by the CPU 12. In such a case, each tuple, for which the precise predicate returns a logic value "1", may illustratively be placed into a temporary read set (i.e., a temporary location in the memory 14 or 16 of the general purpose computer 10) or temporary snapshot of the relation. The temporary snapshot of the relation thus contains only tuples which satisfy the precise portion of the query. Illustratively, the imprecise predicates are subsequently only applied to the tuples of the temporary snapshot.

To evaluate the imprecise predicates, the CPU 12 applies a membership function, corresponding to each imprecise predicate, to appropriate attribute values of each tuple which may potentially satisfy the query (or in the foregoing illustration, each tuple for which the precise predicate returned a logic value "1"). The application of each membership function to the attribute values of a single tuple produces a possibility value. The possibility value indicates the possibility that the tuple satisfies the imprecise predicate. If the imprecise query comprises more than one imprecise predicate, a possibility value for each imprecise predicate will be produced for each tuple. In such a case, the CPU 12 combines the possibility values into a single resultant possibility value on a per tuple basis using fuzzy logic operators.

The particular fuzzy logic operators which are applied to possibility values are chosen depending on how the imprecise predicates are related to in the query. For instance, a complex imprecise query to retrieve all tuples with a young age attribute value and having a height attribute value which is not tall is a combination of two imprecise predicates. This combination may be represented as young(age) AND NOT tall(height). The combination may be evaluated by separately applying a membership function for each imprecise predicate (i.e., young and tall) to the appropriate attribute value of each tuple (i.e., age and height, respectively). Thereafter, for each tuple, the possibility value obtained in applying the tall membership function is subtracted from the value one in accordance with the definition of the fuzzy logic operator "NOT." The value obtained from the subtraction is combined with the possibility value obtained from applying the membership function for young using the fuzzy logic operator "AND." To that end, the minimum of these two possibility values is returned. This minimum value is then returned as the resultant possibility value of the tuple.

The above examples illustrate the application of single dimensional membership functions (e.g., young(age), tall(height)). Such membership functions have been used to illustrate the invention merely for purposes of clarity. Multi-dimensional membership functions (e.g., healthy(weight,height)), which are not separable into single dimensional membership functions, are also supported by the present invention.

Thus, for each tuple, one resultant possibility value is obtained indicating the possibility that the tuple is a member of the set which satisfies the precise and imprecise portions of the query. The CPU 12 then illustratively sorts the tuples of this set according to their respective resultant possibility values. In addition, a threshold may be set which the possibility value of each tuple must exceed in order to be a member of the read set of the query. This is desired in certain contexts to eliminate marginally acceptable tuples from the read set. Alternatively, only the N tuples with the highest possibility values may be placed in the read set (where N is an integer). Thereafter, the CPU 12 may display the tuples of the read set on the I/O device 20, store the tuples of the read set in memory 14 or 16 or perform other calculations with the tuples of the read set.

The system according to the invention also supports updating, e.g., adding data to or deleting data from, the relation stored in the memory 14 or 16. As such, additions or deletions from the relation may be inputted to the general purpose computer 10, e.g., via the I/O device 20. Thereafter, the data may be added to or deleted from the relation stored in the memory 14 or 16.

Figure 4:
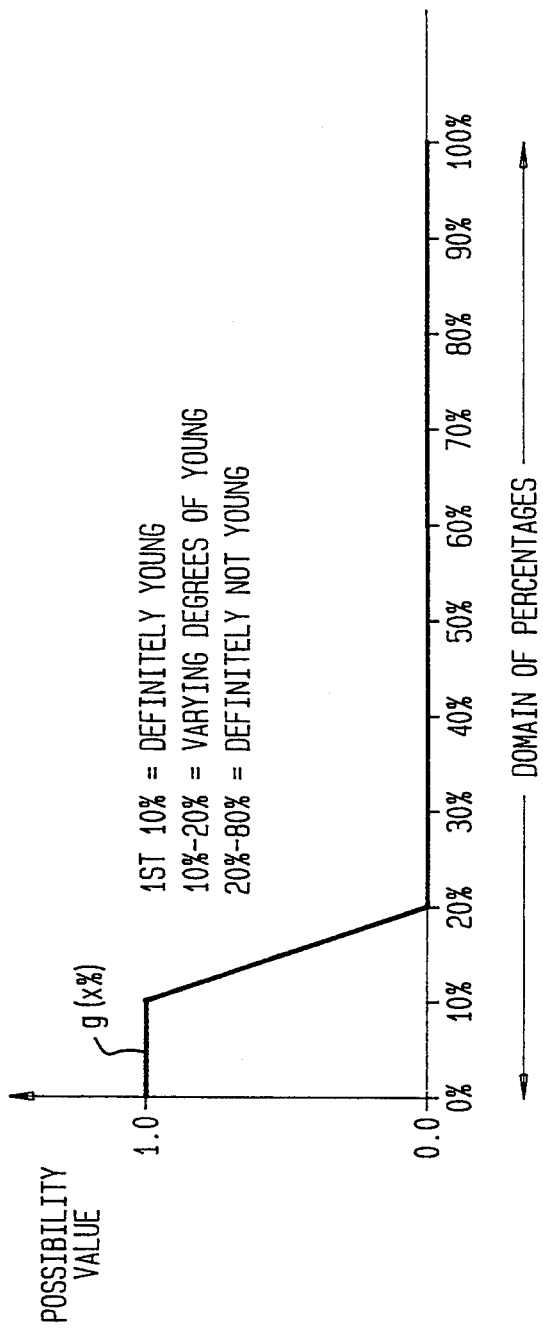
FIG. 4 depicts a statistical membership function according to the present invention corresponding to the function of FIG. 2.

In a preferred embodiment of the present invention, statistical membership functions, rather than static membership functions, are applied to attribute values. As indicated above, statistical membership functions are functions that can be defined over domains that differ from the domain of the attributes on which the statistical membership functions are applied. FIG. 4 depicts a statistical function $g(x\%)$ where the statistical membership function $g(x\%)$ is defined as a percentage of the attribute domain. As depicted, $g(x\%)$ maps the domain portion $x\% = 0\%$ to 10% to the possibility value 1. Additionally, the domain portion $x\% = 10\%$ to 20% is mapped to possibility values in accordance with a profile which begins at the possibility value 1 and ends at the possibility value 0 as the domain goes from 10% to 20%. Finally, the domain portion $x\% = 20\%$ to 100% is mapped to the possibility value 0.

Statistical membership functions are preferred over static membership functions because statistical membership functions may be used in any domain of attribute values. Thus, as indicated above, the same statistical function may be used in a plurality of queries covering different attribute domains. For instance, if the above $g(x\%)$ function corresponds to the imprecise query "young," it may be used in the domain limited to ages (1,5) or the domain of ages (65,90), etc.

Because the statistical membership function $g(x\%)$ is defined on the domain of percentages, rather than actual attribute values, it must first be transformed to the corresponding domain of attributes. To that end, the CPU 12 examines the appropriate attribute values of each tuple which may potentially satisfy the query. For example, if young(age) is an imprecise predicate of the query, the CPU 12 examines the age attribute values of the tuples. The CPU 12 may perform this examination contemporaneously while precise predicates are being applied to the relation or after the temporary snapshot of the relation is obtained.

During the examination, the CPU 12 determines the smallest and largest values of each attribute referenced by the predicate. The CPU 12 sets a corresponding difference variable equal to the difference between the largest and smallest values, i.e.:

$$diff(A) = largest(A) - smallest(A) \qquad (1)$$

where A is an attribute, largest(A) is the largest value of the attribute A, smallest(A) is the smallest value of the attribute A and diff(A) is the difference between the two.

Using the smallest value and the value stored in the difference variable, the CPU 12 transforms the statistical membership function to the domain of the corresponding attribute. For instance, an arbitrary attribute value $a_i$ is defined by the CPU 12 for each, or for selected, percentiles $x_i\%$ by:

$$a_i = x_i\% * diff(A) + smallest(A) \qquad (2)$$

Using this arbitrary value $a_i$, the CPU 12 defines a transformed possibility function $G(a_i)$ where:

$$G(a_i) = g(x_i\%) \qquad (3)$$

The CPU 12 then applies the transformed membership functions, e.g., $G(a_i)$ as defined in (3) above, to respective tuple attribute values.

The use of a linear transformation of a statistical function, as discussed above, is merely for illustration purposes. Other transformations may also be used. For example, a statistical function may be transformed in accordance with a cumulative distribution of values over the domain.

The implementation of the above method can easily overwhelm a conventional CPU 12. In a preferred embodiment of the invention, a specialized fuzzy query processing system is provided for efficiently evaluating an imprecise query. As depicted in FIG. 5, such a fuzzy query processing system 30 for evaluating imprecise queries may illustratively be interfaced to a general purpose computer 10 via the bus 18. By means of the interconnection, the general purpose computer 10 and the fuzzy query processing system 30 may communicate with one another. For instance, imprecise queries, entered at the I/O device 20 (FIG. 3), may be transmitted by the general purpose computer 10 to the fuzzy query processing system 30 which evaluates the query. The fuzzy query processing system 30 may illustratively return identified tuples and their corresponding possibility values to the general purpose computer 10 for display on the I/O device 20 (FIG. 3). Additionally, the general purpose computer 10 may instruct the fuzzy query processing system 30 to store data in, or delete data from, the relation before or after the evaluation of queries.

Referring now to FIG. 6, one embodiment of the fuzzy query processing system 30 will be described in greater detail. The fuzzy query processing system 30 of FIG. 6 is especially suited for applying membership functions to tuples of a database on the fly, i.e., in real time. The fuzzy query processing system 30 comprises a fuzzy query processor 34 connected to a database memory 32 via line 33. By means of this interconnection, the fuzzy query processor 34 may access the data of the memory 32 for adding data to and deleting data from the database.

The memory 32 is connected, via line 36, to a selection system 40 such as that disclosed by U.S. Pat. No. 5,050,075. In the selection system 40, a transmitter 41 repetitively retrieves the entire contents of a relation from the memory 32 via line 36. Each time the relation is retrieved, the transmitter 41 broadcasts a bitstream containing the relation over a downstream broadcast channel 42.

A plurality of filters 43-1, 43-2, . . . , 43-n, such as those disclosed in U.S. Pat. No. 5,050,075, are connected to the channel 42. As depicted, each filter 43-1, 43-2, . . . , 43-n is connected in parallel to the broadcast channel 42. Each filter illustratively comprises a high speed comparator and sufficient arithmetic circuitry for performing on the fly computations on data received over the broadcast channel 42. Each filter 43-1, 43-2, . . . , 43-n may also be programmed by the fuzzy query processor 34. Illustratively, the fuzzy query processor 34 programs each filter 43-1,43-2, . . . , 43-n by issuing instructions to the filters 43-1, 43-2, . . . , 43-n via the communications channel 44.

This selection system 40 is capable of performing multiple high speed, parallel computations on the fly. For each broadcast of the relation on the broadcast channel 42, each filter 43-1, 43-2, . . . , 43-n selectively reads particular data of the relation. For instance, each filter 43-1, 43-2, . . . , 43-n may read the values of one or more particular attributes of each, or selected, tuples. Each filter 43-1, 43-2, . . . , 43-n also has sufficient circuitry for applying membership functions and precise predicates to produce boolean and possibility values. Additionally, each filter 43-1, 43-2, . . . , 43-n, for example, the filter 43-1, may combine possibility and boolean values local to that filter, e.g., the filter 43-1, using fuzzy logic and logic operators. The combination of possibility and boolean values is also performed on the fly.

The filters 43-1, 43-2, . . . , 43-n, are capable of transferring possibility values and respective tuple identifiers, to the fuzzy query processor 34 via the communications channel 44. The fuzzy query processor 34 may perform subsequent computations on the possibility values.

In the evaluation of an imprecise query, the fuzzy query processor 34 transforms the membership functions into filtering instructions for execution by one or more filters 43-1, 43-2, . . . , 43-n. The fuzzy query processor then transmits these instructions, as well as instructions for applying precise predicates, logic and/or fuzzy logic operations, to the filters 43-1, 43-2, . . . , 43-n.

The transmitter 41 repetitively retrieves the tuples of a relation stored in the memory 32 and broadcasts the relation on the broadcast channel 42 in the form of a bitstream. The filters 43-1, 43-2, . . . , 43-n monitor the bitstream of the broadcast channel 42. The filters 43-1, 43-2, . . . , 43-n retrieve data of the relation from the broadcast channel 42. Using the retrieved data, the filters 43-1, 43-2, . . . , 43-n illustratively apply any precise predicates to the tuples of the relation as the relation is broadcast over the channel 42. In addition, the filters 43-1, 43-2, . . . , 43-n compute the possibility values of each tuple of the relation which may still potentially satisfy the query. The computation of the possibility values by the filters 43-1, 43-2, . . . , 43-n is preferably performed on tuples contemporaneously with the application of the precise predicates. In other words, both precise predicates and membership functions are illustratively applied to attribute values of each tuple of the relation during a single broadcast of the relation on the broadcast channel 42. Thereafter, identifiers to tuples, and their possibility values, are transmitted to the fuzzy query processor 34 via the communications channel 44.

The fuzzy query processor 34 may perform subsequent computations on the possibility values. For example, the filters 43-1, 43-2, . . . , 43-n may transmit a plurality of possibility values for each tuple. In such a case, the fuzzy query processor 34 illustratively combines the possibility values to compute a single resultant possibility value for each tuple.

Using the resultant possibility values, the fuzzy query processor 34 illustratively identifies and sorts the tuples which satisfy the query. Alternatively, the fuzzy query processor 34 may send identification instructions to the filters 43-1, 43-2, . . . , 43-n. The filters 43-1, 43-2, . . . , 43-n then return particular tuples as they are broadcast on the broadcast channel 42 to the fuzzy query processor 34. These tuples may then be transmitted to the general purpose computer 10 for display on the I/O device 20 (FIG. 1) or used for further processing.

The fuzzy query processing system 30 may also apply statistical membership functions to appropriate attribute values. In such a case, the fuzzy query processor 34 instructs the filters 43-1, 43-2, . . . , 43-n to transform the membership functions and apply the transformed membership functions to appropriate attribute values. Illustratively, the application of a statistical membership function requires two broadcasts of the relation on the broadcast channel 42. During the first broadcast, appropriate attribute values of the tuples are illustratively examined to determine the maximum and minimum values for transforming the statistical membership function. During the second broadcast of the relation, the transformed membership function is applied to appropriate attributes of the tuples as they are broadcast on the broadcast channel 42.

In another embodiment of the present invention, the general purpose computer 10 or fuzzy query processing system 30 uses adaptive feedback in the evaluation of imprecise queries. Adaptive feedback is particularly useful where the same query is executed repeatedly and it is desired to optimize each successive execution. For each successive execution, feedback is used to modify the membership functions corresponding to the imprecise predicates of the query. Illustratively, a general purpose computer 10 or fuzzy query processing system 30 according to this embodiment may be employed in a self optimizing control system.

Illustratively, two forms of adaptive feedback may be supported in evaluating imprecise queries. In a first feedback implementation, an imprecise query is repeatedly executed on a relation which is simultaneously and continually updated. For example, the general purpose computer 10 may periodically receive changes to the relation via the I/O device 20 and the bus 18. These changes are illustratively stored in the memory 14 or 16. Each membership function is modified for each successive execution of the imprecise query based on the changes to the relation.

This form of feedback may be easily implemented if statistical membership functions are used. Statistical membership functions are transformed to the domain of the attributes at the time they are applied to the relation. As such, the statistical membership functions automatically reflect any changes to attribute values of the relation. Thus, no additional steps for each successive execution of the imprecise query are required.

In a second feedback implementation, the membership function is not modified based on changes to the data of the relation. Instead, the membership function is modified depending on the tuples comprised in the read set obtained from a previous execution of the imprecise query. In such a case, an initial membership function is defined and applied to the relation during the first execution of the imprecise query. A read set is thereby formed comprising identified tuples. The tuples of the read set are then examined. Depending on some property of these tuples, the membership function is modified and applied to the relation during the second execution of the imprecise query. The second read set may then be used to modify the membership function for the third execution of the imprecise query, etc.

Figure 2:
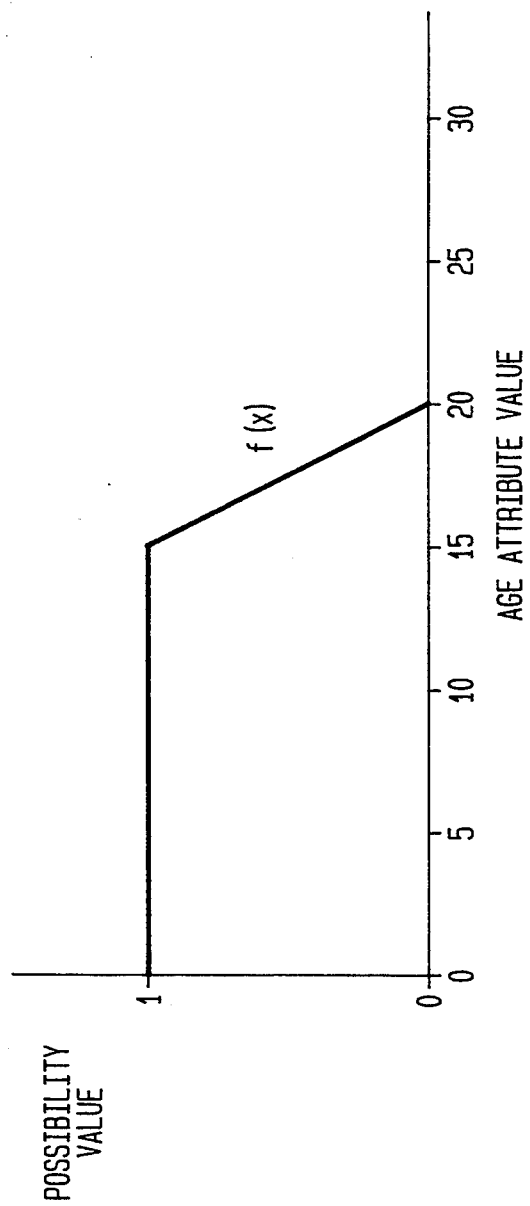
FIG. 2 depicts an exemplary static membership function.

For example, suppose it is desired to identify at least ten tuples with a young age attribute value. An initial membership function may be defined similar to the membership function f(x) of FIG. 2. The membership function f(x) is then applied to the relation. A read set is thereby formed comprising identified tuples. If the read set of the first execution of the imprecise query contains less than ten tuples, a new membership function is specified for a second execution of the imprecise query. For example, the membership function f(x) could be modified to have a profile that goes from 1 to 0 as the domain goes from 15 to some value greater than 20. This new membership function is then applied to the relation and a second read set is formed, etc. Thus, the membership function f(x) is continually modified and applied to the relation until ten tuples are returned. Alternatively, a limit may be imposed on the number of iterations of executing the imprecise query.

Figure 7:
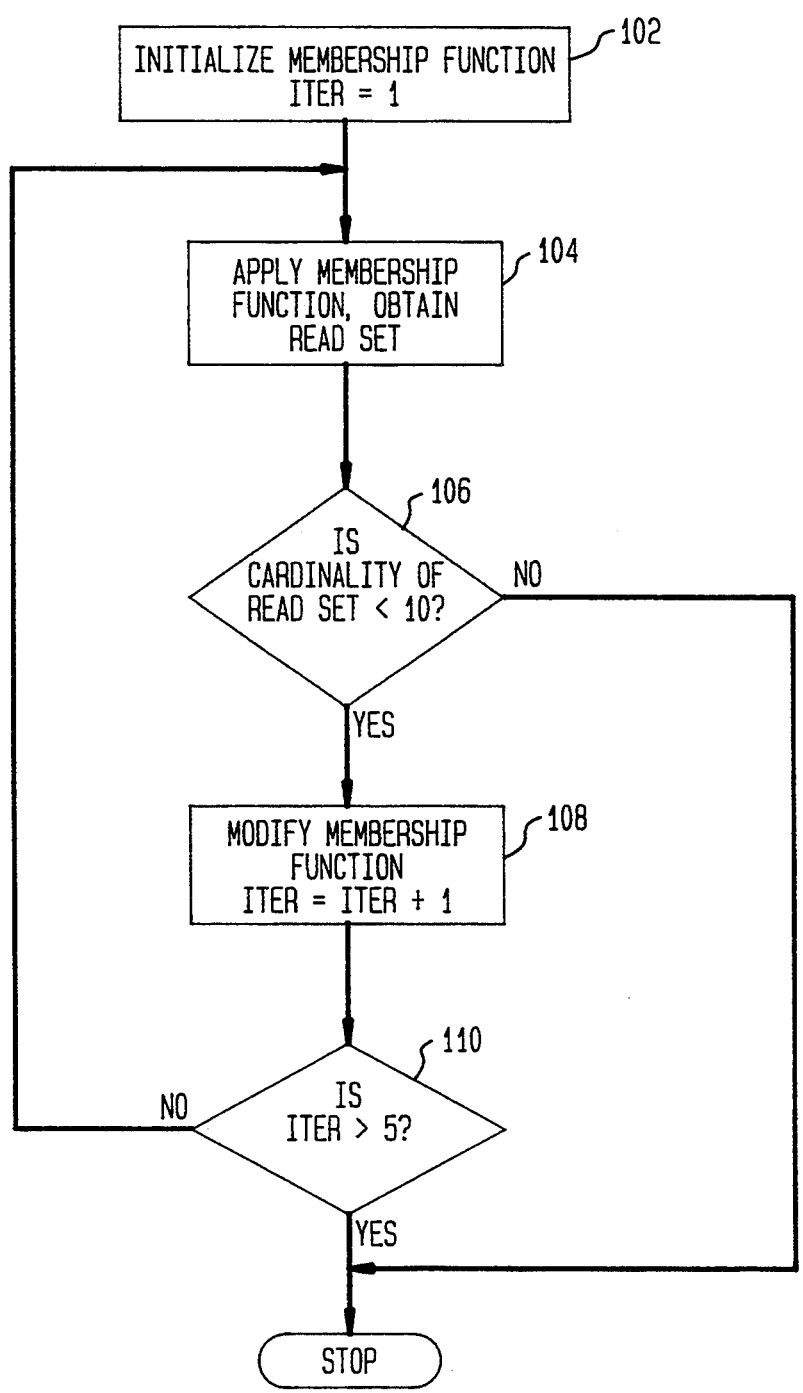
FIG. 7 schematically depicts a process using feedback to modify a membership function.

FIG. 7 schematically depicts the above described steps. Execution in the CPU 12 begins at step 102 where an initial membership function is defined and an iteration counter variable ITER is set to 1. Next, in step 104 the CPU 12 applies the membership function to the relation in a manner previously described. A read set of tuples is obtained. Execution in the CPU 12 continues with step 106 where the CPU 12 determines if the cardinality of the read set is less than ten. If not, then an optimal number of tuples were identified and execution in the CPU 12 ceases.

In less than ten tuples were identified, the CPU 12 modifies the membership function f(x) in step 108. For instance, the profile of f(x) of FIG. 2 may be extended to go from 1 to 0 as the domain goes from 15 to 20+B, where B is a continually increasing parameter. For instance, B may be defined by:

$$B=2*ITER \qquad (4)$$

The ITER variable is also incremented in this step. Next the CPU 12 executes step 110. In step 110, the CPU 12 determines if ITER is greater than five, i.e., if five iterations of modifying and applying a membership function have occurred. If so, execution ceases. If not, execution in the CPU 12 branches back to step 104. It may be appreciated that the CPU executes the steps 104–110 until ten or more tuples are identified or the CPU 12 has executed five iterations of the steps 104–110 (whichever occurs first).

In summary, a method and a system have been disclosed for the efficient and flexible evaluation of imprecise queries. The inventive method efficiently evaluates membership functions at the time queries are executed. Illustratively, statistical membership functions are applied to attribute values in order to evaluate imprecise queries. Statistical membership functions increase the flexibility of query formulation. In addition, an efficient fuzzy query processing system has been disclosed which utilizes a transmitter for repetitively broadcasting tuple data to filters which compute possibility values.

Finally, the above-described embodiments are intended merely to be illustrative of the invention. Numerous other embodiments may be devised by those with ordinary skill in the art without departing from the scope of the following claims.

We claim:

1. In an electronic data processing system comprising a data processor and a memory, a method for executing an imprecise query to identify particular records from a database stored in memory comprising the steps of using said processor, electronically retrieving at least some of the records of said database from said memory, using said processor, electronically determining for each record retrieved from said memory a possibility value in the range between zero and one representing the possibility of the record being in the answer set of the imprecise query by evaluating a statistical membership function to values of at least one particular attribute of each record retrieved from said memory, using said processor, electronically identifying selected ones of said records retrieved from said database which have non-zero possibility values and satisfy said imprecise query, modifying said membership function in response to the execution of said query, and re-executing said query in said electronic data processing system by applying said modified membership function to at least some of the records of said database.

2. In an electronic data processing system comprising a data processor and a memory, a method for executing an imprecise query to identify particular records from a database stored in memory comprising the steps of using said processor, electronically retrieving at least some of the records of said database from said memory by repetitively broadcasting a sequence of records from the database over a broadcast channel, using said processor, electronically determining for each record retrieved from said memory a possibility value in the range between zero and one representing the possibility of the record being in the answer set of the imprecise query by evaluating a membership function defined at the time the query is executed to values of at least one particular attribute of each record retrieved from said memory during execution when each record is retrieved from said memory, said determining step comprising using at least one filter comprised in said processor for electronically applying said membership function to said attribute values of said records retrieved from said memory as said database is broadcast over said channel, using said processor, electronically identifying selected ones of said records retrieved from said database stored in memory which have non-zero possibility values and satisfy said imprecise query, modifying said membership function in response to the execution of said query to provide a broadened response, and re-executing said query in said electronic data processing system by applying said modified membership function to at least some of the records of said database.

* * * * *

UNITED STATES PATENT AND TRADEMARK OFFICE
CERTIFICATE OF CORRECTION

PATENT NO.  : 5,388,259

DATED       : February 7, 1995

INVENTOR(S) : Robert M. Fleischman and William H. Mansfield

It is certified that error appears in the above-identified patent and that said Letters Patent is hereby corrected as shown below:

```
    On the cover page, item [54], change "Notified" to read --Modified--;
    In the Abstract, line 5 ,change "databases" to read --database--.
Column 1, line 17, change "Aug. 17, 1993" to read --Nov. 16, 1993--.
```

Signed and Sealed this

Twenty-second Day of August, 1995

*Attest:*

BRUCE LEHMAN

*Attesting Officer*            *Commissioner of Patents and Trademarks*